United States Patent
Cheng et al.

(10) Patent No.: US 8,462,269 B2
(45) Date of Patent: Jun. 11, 2013

(54) DEVICES AND METHODS FOR EXTRACTING A SYNCHRONIZATION SIGNAL FROM A VIDEO SIGNAL

(75) Inventors: Ping Cheng, Taipei (TW); Shang-Yi Lin, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 1266 days.

(21) Appl. No.: 12/040,935

(22) Filed: Mar. 3, 2008

(65) Prior Publication Data
US 2009/0128695 A1    May 21, 2009

Related U.S. Application Data

(60) Provisional application No. 60/988,451, filed on Nov. 16, 2007.

(51) Int. Cl.
*H04N 5/08*      (2006.01)
(52) U.S. Cl.
USPC ........................................... 348/525
(58) Field of Classification Search
USPC ............... 348/525, 691, 500, 476, 798, 531, 348/601; 375/240.05, 240, 16, 317, 345, 375/355; 345/10, 213
See application file for complete search history.

(56) References Cited

U.S. PATENT DOCUMENTS

| 5,280,356 A | 1/1994 | Hiramatsu et al. |
| 5,561,469 A * | 10/1996 | Schultz .......................... 348/476 |
| 5,805,150 A * | 9/1998 | Nishino et al. ................. 345/213 |
| 5,815,213 A | 9/1998 | Meunier |
| 7,408,592 B2 * | 8/2008 | Lu .................................. 348/691 |
| 2001/0045647 A1 | 11/2001 | Hohn et al. |
| 2003/0108124 A1 * | 6/2003 | Yuan et al. ..................... 375/317 |
| 2005/0128359 A1 | 6/2005 | Huang et al. |
| 2005/0270421 A1 | 12/2005 | Lu |

FOREIGN PATENT DOCUMENTS

| CN | 1756298 | 4/2006 |
| CN | 101304477 A | 11/2008 |

OTHER PUBLICATIONS

CN Office Action mailed Mar. 8, 2010.
English abstract of CN101304477A, pub. Nov. 12, 2008.
English language translation of abstract of CN 1756298 (published Apr. 5, 2006).

* cited by examiner

*Primary Examiner* — Nasser Goodarzi
*Assistant Examiner* — An Nguyen
(74) *Attorney, Agent, or Firm* — McClure, Qualey & Rodack, LLP

(57) ABSTRACT

A device for extracting a synchronization signal from a video signal has a first comparator and an adjustment circuit. The first comparator receives the video signal, compares the video signal with a first threshold, and generates the synchronization signal according to the compared result. The adjustment circuit receives the video signal, compares the video signal with a plurality of second thresholds of different values, and changes the first threshold according to the compared results.

17 Claims, 6 Drawing Sheets

DEVICES AND METHODS FOR EXTRACTING A SYNCHRONIZATION SIGNAL FROM A VIDEO SIGNAL

CROSS REFERENCE TO RELATED APPLICATIONS

The present application claims the benefit of U.S. provisional application entitled "DEVICES AND METHODS FOR EXTRACTING A SYNCHRONIZATION SIGNAL FROM A VIDEO SIGNAL", Ser. No. 60/988,451 filed Nov. 16, 2007.

BACKGROUND OF THE INVENTION

1. Field of the Invention

The invention relates to a device and method for video signal processing, and more particularly to a device and method for extracting a synchronization signal from a video signal.

2. Description of the Related Art

FIG. 1 shows a conventional circuit for extracting an SOG (Sync-on-Green) signal from a video signal. The circuit 1 comprises a clamp circuit 10 and a comparator 11. The clamp circuit 10 receives a video signal VS as shown in FIG. 2 and adjusts a direct-current level of the video signal VS. The comparator 11 compares the video signal VS and a fixed threshold $TH_{fix}$ and generates an SOG signal SOG_OUT. However, since the video signal VS is compared with the fixed threshold $TH_{fix}$, the SOG signal SOG_OUT can not be extracted from the video signal VS precisely when the video signal VS is affected by noise, voltage shifting, or environment's change.

A method and device for dynamically adjusting an SOG signal of a video signal are disclosed in U.S. Patent Application Pub. No. US 2005/0270421. Referring to FIG. 3, a device for dynamically adjusting an SOG signal of a video signal comprises a clamp circuit 410, a comparator 430, a control unit 440, and a triggering level circuit 420. The clamp circuit 410 limits a voltage swing range of a video signal 405 so as to limit the video signal 405 within a clamp level and output a clamped signal 415. The triggering level circuit 420 determines a triggering level for the SOG signal so as to output a triggering signal 425. The comparator 430 compares the clamped signal 415 with the triggering signal 425 so as to output a compared signal 435. The control unit 440 receives the compared signal 435 and provides the triggering level circuit 420 with a feedback control signal 445 so as to adjust the triggering level (threshold) of the SOG signal. Meanwhile, the compared signal 435 is an output SOG signal. According to the device of FIG. 3, the triggering signal 425 with the adjusted triggering level is immediately used by the comparator 430 for comparing with the video signal VS. Thus, if the adjusted triggering level is not appropriate for the videos signal, an incorrect SOG signal is obtained and wrong images based on the incorrect SOG signal are immediately displayed.

BRIEF SUMMARY OF THE INVENTION

A device and a method for extracting a synchronization signal from a video signal, which can provide a more appropriate threshold for extracting a synchronization signal, are provided. An exemplary embodiment of a device for extracting a synchronization signal from a video signal comprises a first comparator and an adjustment circuit. The first comparator receives the video signal, compares the video signal with a first threshold, and generates the synchronization signal according to the compared result of the video signal and the first threshold. The adjustment circuit receives the video signal, compares the video signal with a plurality of second thresholds of different values, and changes the first threshold according to the compared results of the video signal and the second thresholds.

Another exemplary embodiment of a device for extracting a synchronization signal from a video signal comprises a plurality of comparators and a selection circuit. The comparators respectively have thresholds of different values. Each of the comparators compares the video signal with the corresponding threshold and generates a result signal. The selection circuit receives the result signals from the comparators and outputs one of the result signals to serve as the synchronization signal.

An exemplary embodiment of a method for extracting a synchronization signal from a video signal comprises: comparing the video signal with a first threshold; generating the synchronization signal according to a compared result of the video signal and the first threshold; comparing the video signal with a plurality of second thresholds of different values; and changing the first threshold according to the compared results of the video signal and the second thresholds.

Another exemplary embodiment of a method for extracting a synchronization signal from a video signal comprises: comparing the video signal with a plurality of thresholds of different values; generating a plurality of extracted signals according to the compared results of the video signal and the thresholds; and selecting one of the extracted signals to serve as the synchronization signal A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
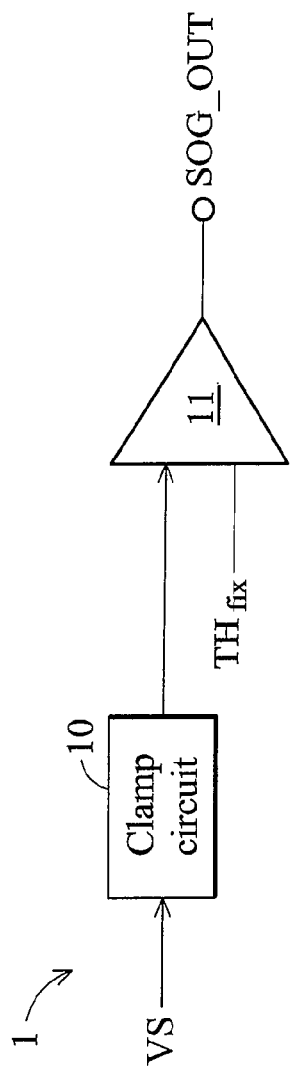
FIG. 1 shows a conventional circuit for extracting an SOG signal from a video signal.
Figure 2:
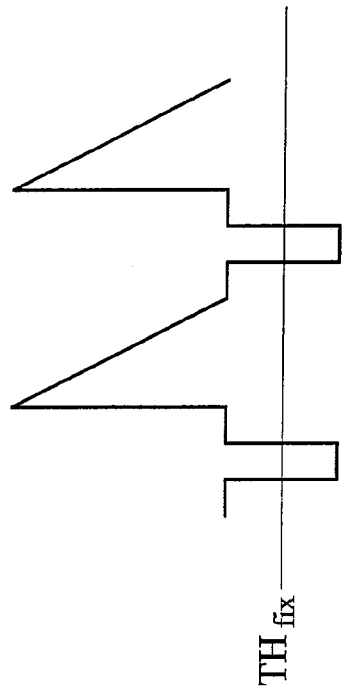
FIG. 2 shows a video signal comprising an SOG signal.
Figure 3:
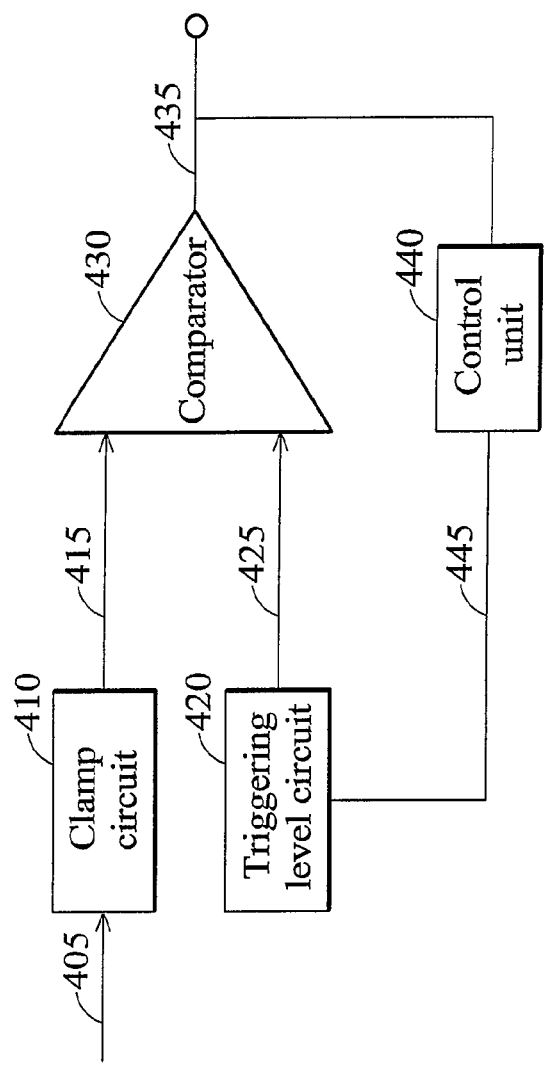
FIG. 3 shows method and a device for dynamically adjusting an SOG signal of a video signal disclosed in U.S. Patent Application Pub. No. US 2005/0270421.

The following description is of the best-contemplated mode of carrying out the invention. This description is made for the purpose of illustrating the general principles of the invention and should not be taken in a limiting sense. The scope of the invention is best determined by reference to the appended claims.

Devices for extracting a synchronization signal from a video signal are provided. In an exemplary embodiment of a device for extracting a synchronization signal from a video signal in FIG. 4, a device 4 comprises a clamp circuit 40, a comparator 41, and an adjustment circuit 42. The clamp circuit 40 receives a video signal VS and adjusts a direct-current (DC) level of the video signal VS. The comparator 41 receives a video signal VS with the adjusted DC level. The comparator 41 compares the video signal VS with a threshold THA and generates synchronization signal SYNC according to the compared result. In some embodiments, the video signal VS comprises an SOG (Sync-on-Green) signal, and the synchronization signal SYNC generated by the comparator 41 is thus the SOG signal. In some embodiments, the video signal VS can comprise an SOY (Sync-on-Luma) signal, and the synchronization signal SYNC generated by the comparator 41 is thus the SOY signal.

The adjustment circuit 42 receives the video signal VS with the adjusted DC level. The adjustment circuit 42 compares the video signal VS with a plurality of thresholds $THB_1$-$THB_N$ (wherein $N \geq 2$) of different values and changes a value of the threshold THA according to the compared results. The following is a detailed description of the adjustment circuit 42

The adjustment circuit 42 comprises a comparator 43, a determination unit 44, a selection unit 45, and a memory 46. The comparator 43 receives the video signal VS with the adjusted DC level. The comparator 43 compares the video signal VS with the thresholds $THB_1$-$THB_N$ of different values to correspondingly generate a plurality of result signals $RS_1$-$RS_N$. The determination unit 44 receives the result signals $RS_1$-$RS_N$ and generates at least one selection signal SS according to the result signals $RS_1$-$RS_N$. For example, the determination unit 44 may generate one selection signal SS according to the M result signals after comparator 43 compares the video signal VS and M thresholds among the N thresholds $THB_1$-$THB_N$ (wherein $M \leq N$). The memory 46 stores a look-up table which has a plurality of predefined values. The selection unit 45 captures one of the predefined values according to the selection signal SS to serve as the adjusted threshold $TH_{adj}$. The selection unit 45 provides the adjusted threshold $TH_{adj}$ to serve as the threshold THA. In some embodiments, the memory 46 is included in the selection unit 45. In some embodiments, the device 4 may further comprise a programmable gain amplifier (PGA) 47 coupled between the clamp circuit 40 and the comparator 41. The PGA 47 amplifies the video signal VS transmitted from the clamp circuit 40.

Figure 4:
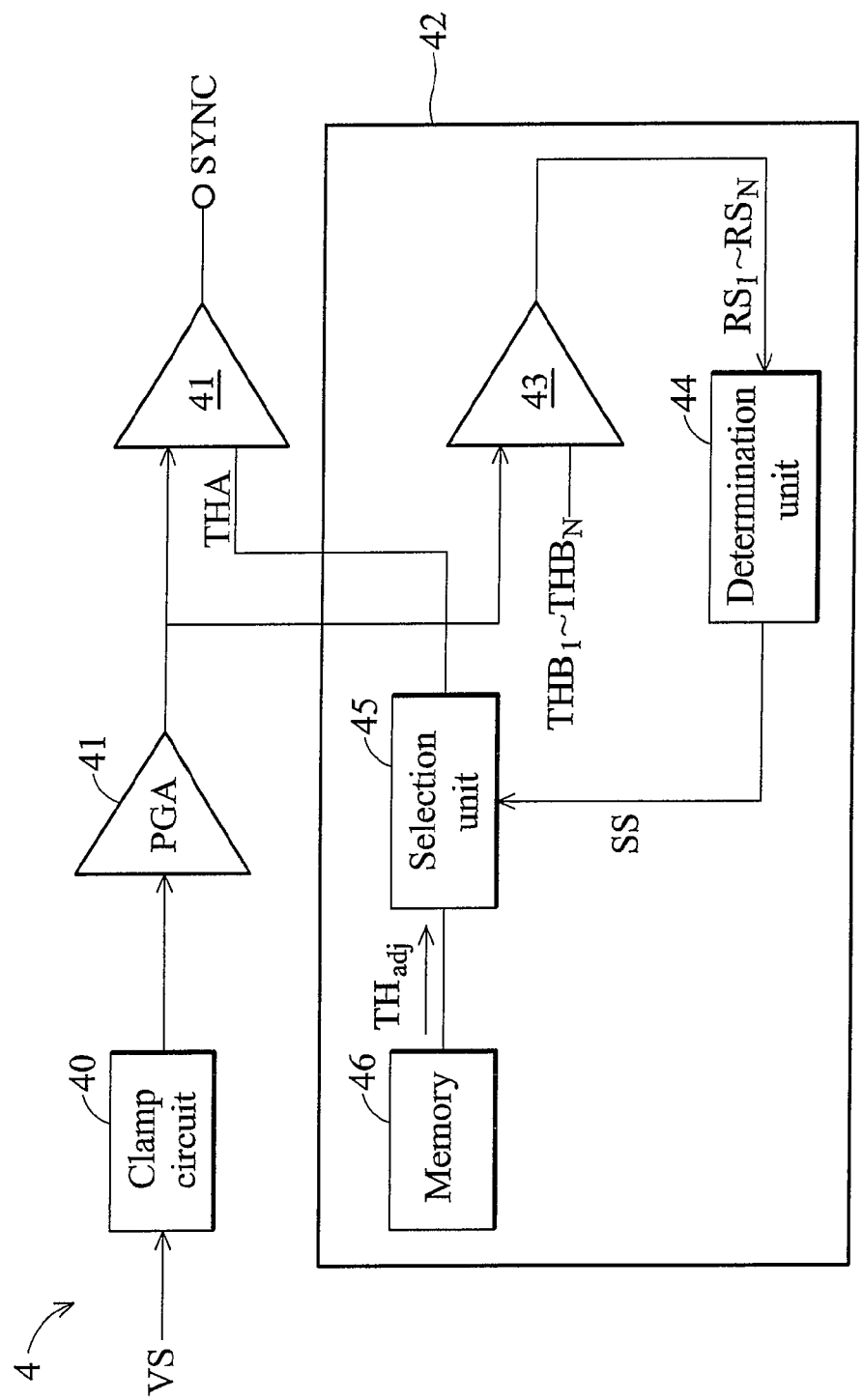
FIG. 4 shows an exemplary embodiment of a device for extracting a synchronization signal from a video signal according to the invention.

According to the embodiment of FIG. 4, after comparing the video signal VS with the thresholds $THB_1$-$THB_N$ of different values, the adjustment circuit 42 provides the adjusted threshold $TH_{adj}$ to serve as the threshold THA according to the compared results. For example, the adjustment circuit 42 can consider some relationships between the video signal VS and the thresholds $THB_1$-$THB_N$, such as the relative voltage levels of them, or the number of extracted synchronization signal in $RS_1$~$RS_N$, and then provides the adjusted threshold $TH_{adj}$. Thus, the adjustment circuit 42 can provide a more appropriate threshold for the comparator 41 to extract the synchronization signal SYNC.

Figure 5:
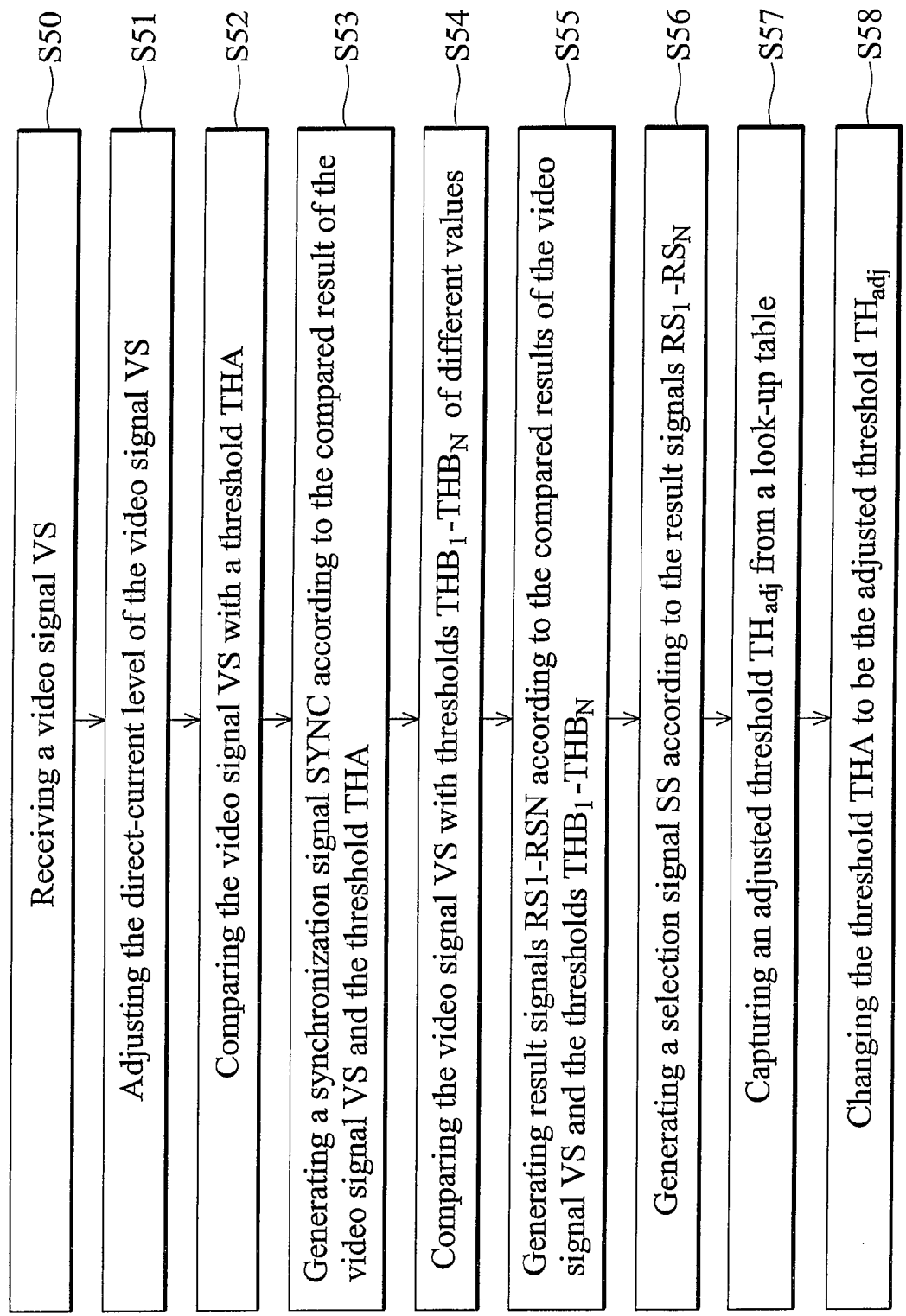
FIG. 5 is a flowchart of an exemplary embodiment of a method for extracting a synchronization signal from a video signal according to the invention.

FIG. 5 shows a flow chart of a method for extracting a synchronization signal from a video signal. The method is described according to FIGS. 4 and 5. First, a video signal VS is received by the clamp circuit 40 (step S50). The direct-current level of the video signal VS is adjusted by the clamp circuit 40 (step S51). The video signal VS is compared with a threshold THA by the comparator 41 (step S52), and then a synchronization signal SYNC is generated according to the compared result of the video signal VS and the threshold THA by the comparator 41 (step S53). In some embodiments, the video signal VS comprises an SOG (Sync-on-Green) signal, and the synchronization signal SYNC generated by the comparator 41 is thus the SOG signal. In some embodiments, the video signal VS can comprise an SOY (Sync-on-Luma) signal, and the synchronization signal SYNC generated by the comparator 41 is thus the SOY signal.

The video signal VS is compared with thresholds $THB_1$-$THB_N$ of different values by the comparator 43 (step S54). Result signals $RS_1$-$RS_N$ are generated according to the compared results of the video signal VS and the thresholds $THB_1$-$THB_N$ by the comparator 43 (step S55). At least one selection signal SS is generated according to the result signals $RS_1$-$RS_N$ by the determination unit 44 (step S56). Then, an adjusted threshold $TH_{adj}$ is captured from the look-up table stored in the memory 46 according to the selection signal by the selection unit 45 (step S57). The adjusted threshold $TH_{adj}$ is provided according to the selection signal to serve as the threshold THA by the selection unit 45 to change the threshold THA (step S58).

Figure 6:
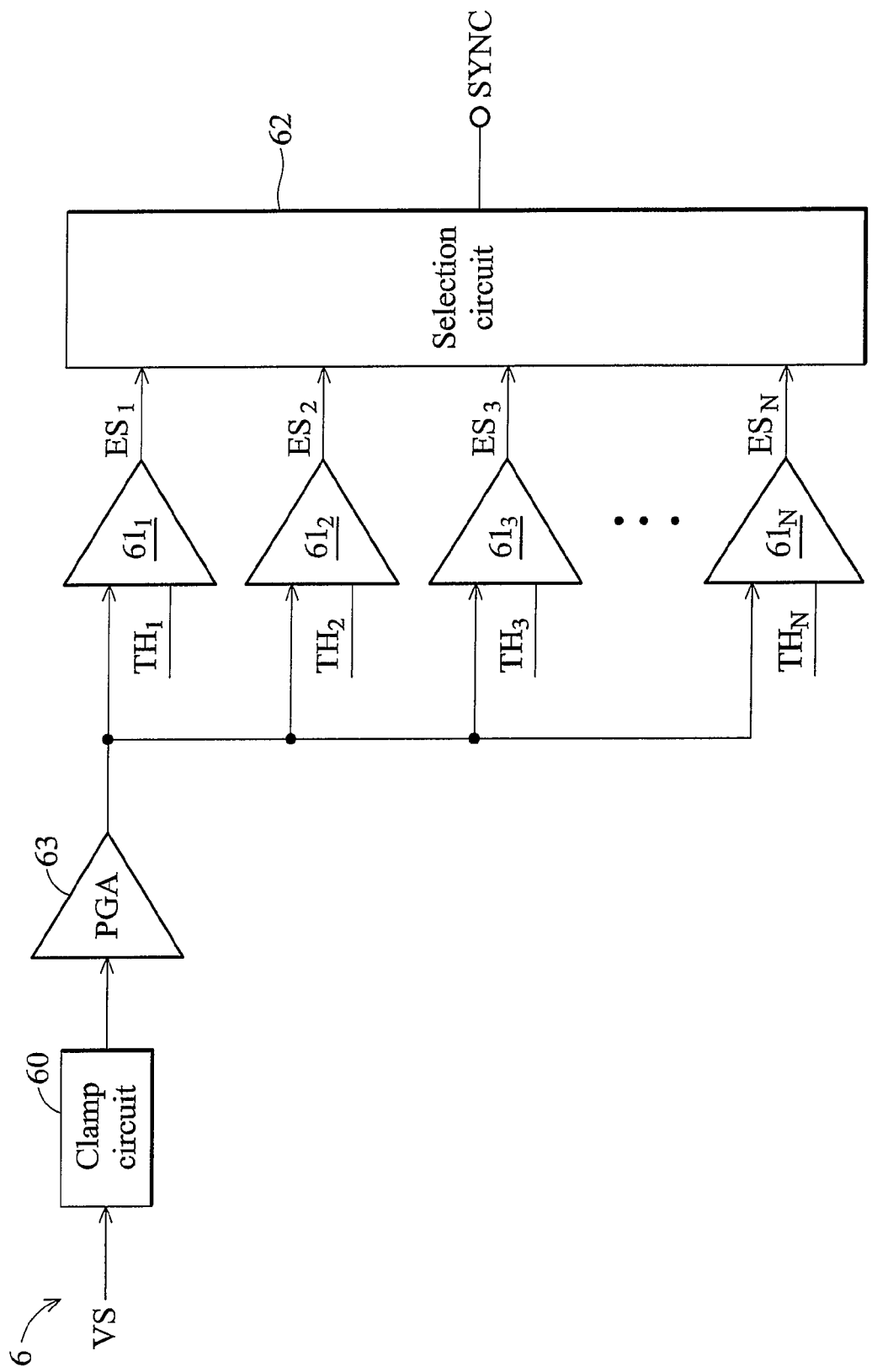
FIG. 6 shows another exemplary embodiment of a device for extracting a synchronization signal from a video signal according to the invention.

In an exemplary embodiment of a device for extracting a synchronization signal from a video signal in FIG. 6, a device 6 comprises a clamp circuit 60, a plurality of comparators $61_1$-$61_N$, and a selection circuit 62. The comparators $61_1$-$61_N$ respectively have thresholds $TH_1$-$TH_N$ (wherein $N \geq 2$) of different values. The clamp circuit 60 receives a video signal VS and adjusts a direct-current (DC) level of the video signal VS. Each of the comparators $61_1$-$61_N$ compares the video signal VS with its respective threshold and generates an extracted signal ES. The selection circuit 62 receives the extracted signals $ES_1$-$ES_N$ from the comparators $61_1$-$61_N$ and outputs one of the extracted signals $ES_1$-$ES_N$ to serve as a synchronization signal SYNC. In some embodiments, the video signal VS comprises an SOG (Sync-on-Green) signal, and the synchronization signal SYNC is thus the SOG signal. In some embodiments, the video signal VS can comprise an SOY (Sync-on-Luma) signal, and the synchronization signal SYNC is thus the SOY signal. According to this embodiment, the selection circuit 62 can select an optimal result signal to serve as the synchronization signal SYNC for image displaying. For example, an optimal result signal, which is obtained by comparing the video signal with a middle threshold among all thresholds that can be used for stably extracting the synchronization signal and leaving enough margins for noise and voltage drift, or with a threshold that can be used for extracting the synchronization signal with a minimum jitter, or with other suitable threshold, may be selected by the selection circuit 62 to serve as the synchronization signal SYNC.

In some embodiments, the device 6 further comprises a programmable gain amplifier (PGA) 63 coupled between the clamp circuit 60 and the comparators $61_1$-$61_N$. The PGA 63 amplifies the video signal VS transmitted from the clamp circuit 60.

Figure 7:
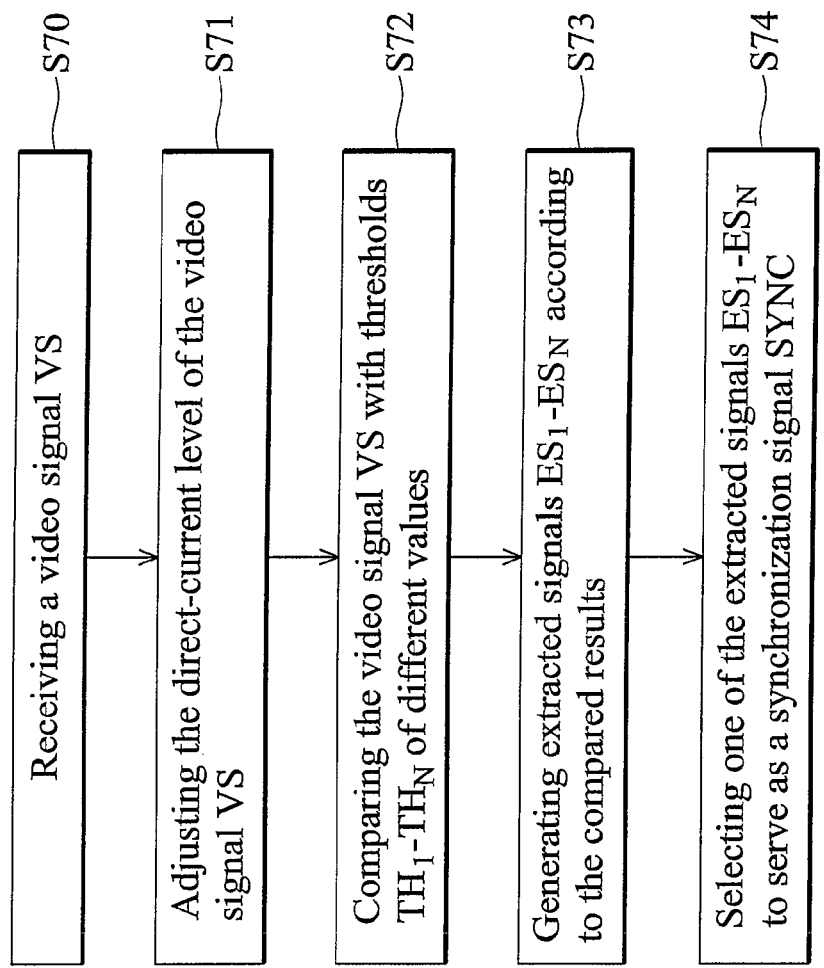
FIG. 7 is a flowchart of another exemplary embodiment of a method for extracting a synchronization signal from a video signal according to the invention.

FIG. 7 shows a flow chart of a method for extracting a synchronization signal from a video signal. The method is described according to FIGS. 6 and 7. First, a video signal VS is received by the clamp circuit 60 (step S70). The direct-current level of the video signal VS is adjusted by the clamp circuit 60 (step S71). The video signal VS is compared with thresholds $TH_1$-$TH_N$ of different values (step S72). Then, extracted signals $ES_1$-$ES_N$ are generated according to the compared results of the video signal VS and the thresholds $TH_1$-$TH_N$ respectively by the comparators $61_1$-$61_N$ (step S73). One of the extracted signals $ES_1$-$ES_N$ is selected by the selection circuit 62 to serve as a synchronization signal SYNC (step S74).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device for extracting a synchronization signal from a video signal, comprising:
   a first comparator for receiving the video signal, comparing the video signal with a first threshold, and generating the synchronization signal according to the compared result of the video signal and the first threshold, wherein the synchronization signals comprises one of an SOG (Sync-on-Green) signal or an SOY (Sync-on-Luma) signal; and
   an adjustment circuit for receiving the video signal, comparing the video signal with a plurality of second thresholds of different values, and changing the first threshold according to the compared results of the video signal and the second thresholds.

2. The device as claimed in claim 1, wherein the adjustment circuit comprises:
   a second comparator for receiving the video signal and comparing the video signal with the second thresholds to correspondingly generate a plurality of result signals;
   a determination unit for receiving the result signals and generating at least one selection signal according to the result signals; and
   a selection unit for providing an adjusted threshold according to the selection signal to serve as the first threshold.

3. The device as claimed in claim 2, further comprising a memory storing a look-up table, wherein the look-up table has a plurality of predefined values for the adjusted threshold, and the selection unit is arranged to capture one of the predefined values according to the selection signal to serve as the first threshold.

4. The device as claimed in claim 2, wherein the determination unit is arranged to generate the selection signal according to a predetermined number of the result signals.

5. The device as claimed in claim 1, further comprising a clamp circuit for adjusting a direct-current level of the video signal and transmitting the adjusted video signal to the first comparator and the adjustment circuit.

6. A method for extracting a synchronization signal from a video signal, comprising:
   comparing the video signal with a first threshold;
   generating the synchronization signal according to a compared result of the video signal and the first threshold, wherein the synchronization signals comprises one of an SOG (Sync-on-Green) signal or an SOY (Sync-on-Luma) signal;
   comparing the video signal with a plurality of second thresholds of different values; and
   changing the first threshold according to the compared results of the video signal and the second thresholds.

7. The method as claimed in claim 6, further comprising:
   generating a plurality of result signals correspondingly according to the compared results of the video signal and the second thresholds;
   generating at least one selection signal according to the result signals; and
   providing an adjusted threshold according to the selection signal to serve as the first threshold.

8. The method as claimed in claim 7, wherein the step of providing the adjusted threshold comprises capturing the adjusted threshold from a plurality of predefined values in a look-up table according to the selection signal.

9. The method as claimed in claim 7, wherein in the step of generating the selection signal, the selection signal is generated according to a predetermined number of the result signals.

10. The method as claimed in claim 6, further comprising adjusting a direct-current level of the video signal before the steps of comparing the video signal with the first and second thresholds.

11. A device for extracting a synchronization signal from a video signal, comprising:
    a plurality of comparators respectively having thresholds of different values, wherein each of the comparators is arranged to compare the video signal with the corresponding threshold and generate an extracted signal; and
    a selection circuit for receiving the extracted signals from the comparators and outputting one of the extracted signals to serve as the synchronization signal, wherein the synchronization signals comprises one of an SOG (Sync-on-Green) signal or an SOY (Sync-on-Luma) signal.

12. The device as claimed in claim 11, further comprising a clamp circuit for adjusting a direct-current level of the video signal and transmitting the adjusted video signal to the comparators.

13. A method for extracting a synchronization signal from a video signal, comprising:
    comparing the video signal with a plurality of thresholds of different values;
    generating a plurality of extracted signals according to the compared results of the video signal and the thresholds; and
    selecting one of the extracted signals to serve as the synchronization signal, wherein the synchronization signals comprises one of an SOG (Sync-on-Green) signal or an SOY (Sync-on-Luma) signal.

14. The method as claimed in claim 13, further comprising adjusting a direct-current level of the video signal before the step of comparing the video signal with the thresholds.

15. The device as claimed in claim 1, wherein the first threshold is set based on the plurality of second thresholds.

16. The device as claimed in claim 15, wherein the first threshold is set based on the relative voltage levels of each of the plurality of second thresholds.

17. The device as claimed in claim 2, wherein the determination unit generates at least one selection signal according to a number of extracted synchronization signals in the result signals.

* * * * *